(12) United States Patent
Gutjahr

(10) Patent No.: US 6,462,869 B1
(45) Date of Patent: Oct. 8, 2002

(54) PROJECTION SCREEN AND SYSTEM FOR LARGE-SURFACE IMAGES

(76) Inventor: Jörg Gutjahr, Heideweg 18, Nümbrecht (DE), D-51588

(*) Notice: Subject to any disclaimer, the term of this patent is extended or adjusted under 35 U.S.C. 154(b) by 0 days.

(21) Appl. No.: 09/701,666
(22) PCT Filed: May 27, 1999
(86) PCT No.: PCT/EP99/03658
§ 371 (c)(1), (2), (4) Date: Nov. 30, 2000
(87) PCT Pub. No.: WO99/64902
PCT Pub. Date: Dec. 16, 1999

(30) Foreign Application Priority Data

Jun. 5, 1998 (DE) .......................... 198 25 192

(51) Int. Cl.⁷ .................. G03B 21/56; G03B 21/60; G03B 5/32; G03H 1/00; G03H 1/22
(52) U.S. Cl. .................. 359/443; 359/1; 359/9; 359/19; 359/28; 359/32; 359/456; 359/460
(58) Field of Search .................. 359/443, 1, 28, 359/32, 460, 455, 456, 19, 9

(56) References Cited

U.S. PATENT DOCUMENTS

| | | | |
|---|---|---|---|
| 2,238,629 A | * 4/1941 | Deninson | 352/44 |
| 3,187,339 A | * 6/1965 | Clay | 352/61 |
| 4,500,163 A | 2/1985 | Burns et al. | 350/3.7 |
| 5,162,929 A | 11/1992 | Roddy et al. | 359/17 |
| 5,767,993 A | * 6/1998 | Burney | 359/32 |
| 6,229,562 B1 | * 5/2001 | Kremen | 348/51 |
| 6,256,123 B1 | * 7/2001 | Hazama | 359/25 |

FOREIGN PATENT DOCUMENTS

| | | |
|---|---|---|
| DE | 43 30 384 A1 | 3/1995 |
| GB | 2 287 554 A | 9/1995 |
| WO | WO 96/07953 | 3/1996 |

OTHER PUBLICATIONS

"Halographic and Interferometric Viewing Screens" by Dietrich Meyerhofer, Applied Optics, vol. 12, No. 9, pp. 2180–2184, Sep. 1973.

* cited by examiner

Primary Examiner—Christopher Mahoney
Assistant Examiner—Magda Cruz
(74) Attorney, Agent, or Firm—Ohlandt, Greeley, Ruggiero & Perle, LLP

(57) ABSTRACT

A projection screen (30) for representation of images by back-projection comprises a plurality of holographic-optical elements (10) arranged in one plane. The holographic-optical elements are illuminated by a projector (14) comprising three projection devices (22,24,26). Each projection device (22,24,26) generates a light bundle (16,18,20) respectively including the chromatic components of an image to be projected. Each holographic-optical element (10) comprises at least one lens and one diffraction grating which are diffracted in such a manner by the different light bundles (16,18,20) that the holographic-optical element (10) will emit an exiting light bundle (28) with an identical exit angle (β) in the direction of the viewer (12). Such a projection screen will scatter the light only to a small extent so that the projection screen can be used also at daylight and for large-surface image projection.

11 Claims, 3 Drawing Sheets

Figure 1:
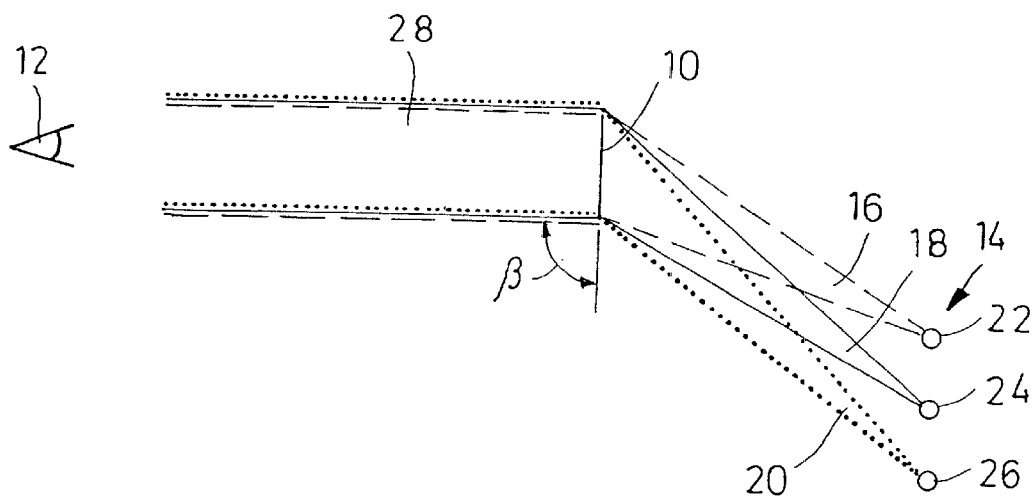

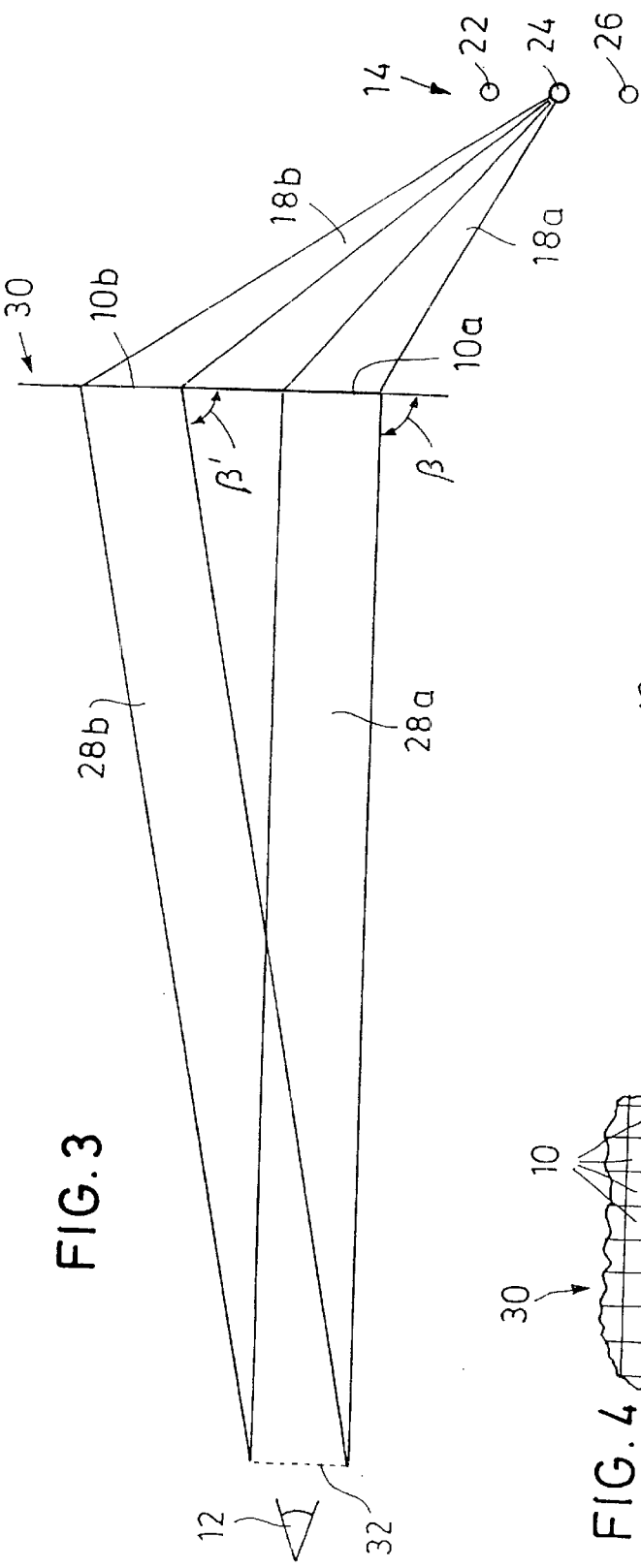
FIG. 3
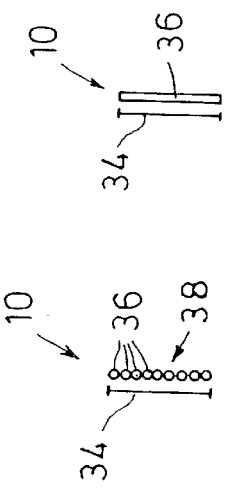
FIG. 5
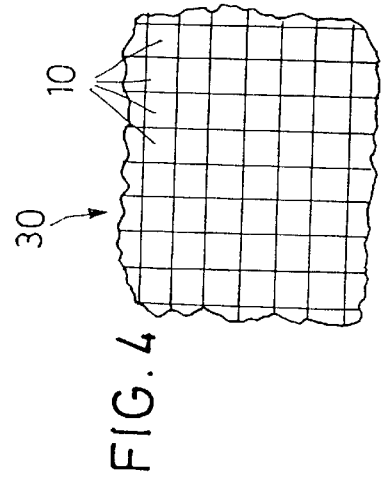
FIG. 6
FIG. 4

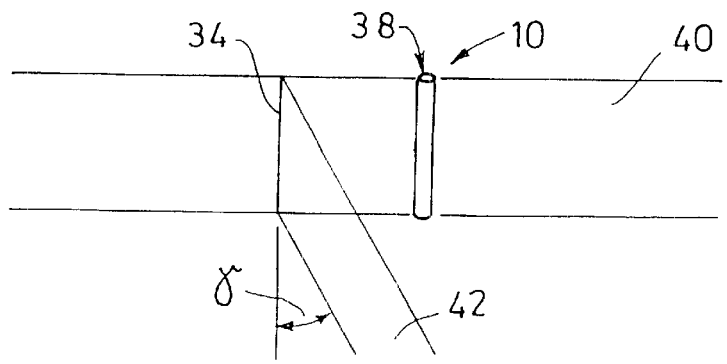
FIG. 7
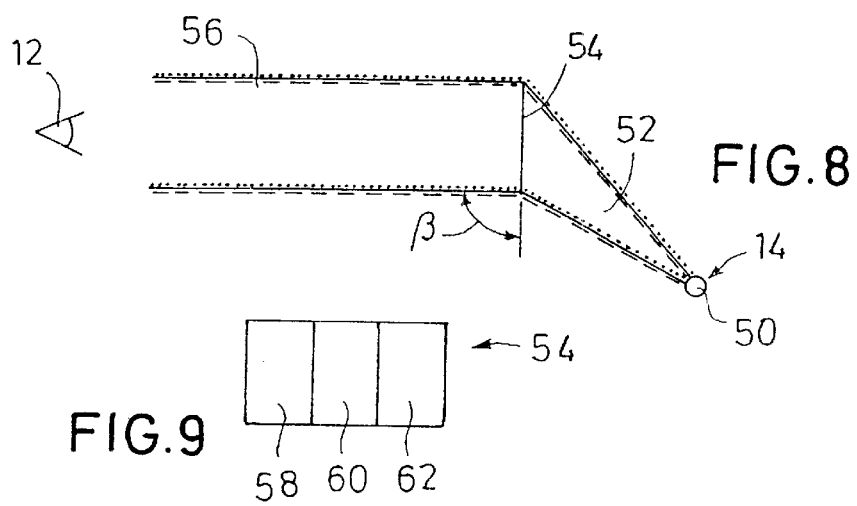
FIG. 8
FIG. 9
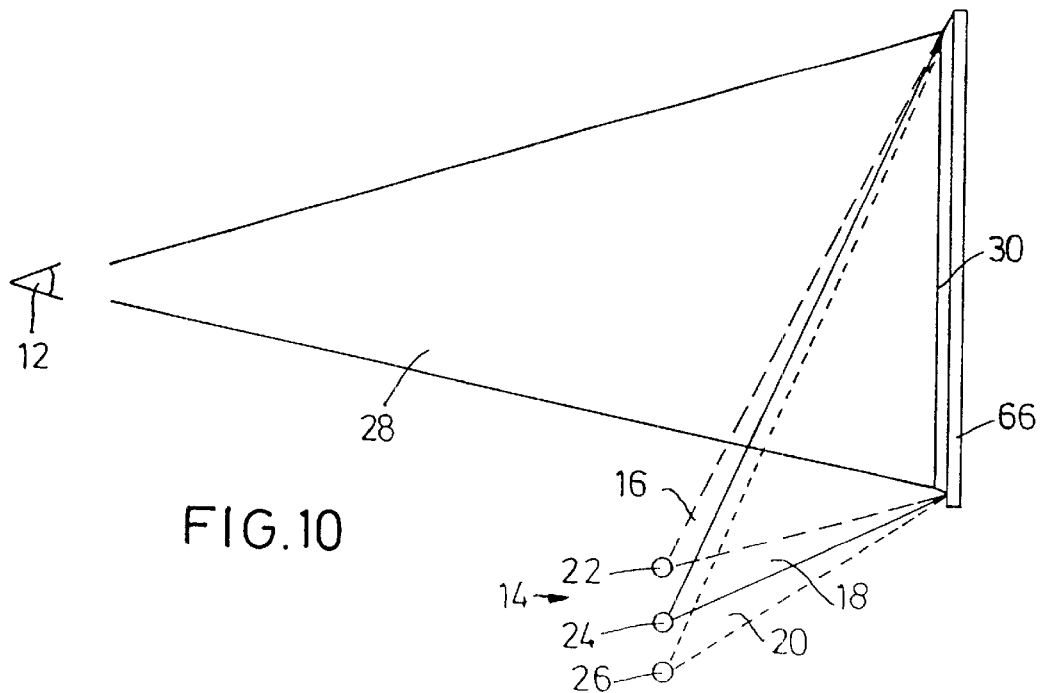
FIG. 10

PROJECTION SCREEN AND SYSTEM FOR LARGE-SURFACE IMAGES

The invention relates to a projection screen, particularly a projection screen for large-surface image projection.

For large-surface image projection, as e.g. in movie theaters, use is made of projection screens. Images are projected onto the projection screens from a projector arranged on the side of the viewers. The light incident on the projection screen is scattered by the projection screen so that the image becomes visible to the viewer on the projection screen. Since such projection screens will scatter also extraneous light, such as e.g. daylight, the room has to be darkened. Outdoors use of such projection screens is possible only at night, while also in this case it must be precluded that extraneous light, e.g. from streetlamps, is allowed to impinge on the projection screen. In projection screens of this type, already minor fractions of extraneous light will cause a decrease of the image quality.

Further, projection screens are known wherein the projector is arranged on the rear side of the projection screen. In this case, the image is formed by back-projection on the projection screen which again is provided to scatter incident light.

In the periodical APPLIED OPTICS (12; 1973) 21.80–84, a microfilm display device is described wherein a combination of a diffusing screen and a lens is realized by means of a hologram. The hologram serves as an viewing screen for visualization of the microfilm images which are projected via a magnifying lens. The hologram, when illuminated by any light, appears as a ground glass, i.e. it is milky and opaque. The purpose of the hologram resides in obviating the need for a voluminous and expensive lens.

Known from DE 43 30 384 A1 is an illuminated panel having image holograms, forming surface or line patterns, stored therein. The holograms in the fields of various colors have been generated under different angles of illumination so that the fields will present different colors to the user. Only the stored pattern can be visualized in each given case.

It is an object of the invention to provide a projection screen which is useful particularly for large-surface image projection also if the fraction of extraneous light is large.

According to the invention, the above object is achieved by the features of claim 1.

The projection screen according to the invention comprises a plurality of holographic-optical elements arranged in one plane. On the holographic-optical element, forming a closed surface, an image can be generated by back-projection. In doing so, each individual holographic-optical element will present one image portion of a projected image. In this manner, the image to be projected is subdivided into individual pixels, as it were, and each pixel is represented by a holographic-optical element.

Each holographic-optical element comprises at least one diffraction grating and at least one lens. The diffraction grating is arranged to diffract light bundles of e.g. red, green and blue chromatic components of the to-be-projected image in a different manner. Through the lens, the image to be projected is represented in an image plane.

The holographic-optical elements used in the projection screen of the invention are provided in such a manner that the light bundles of different chromatic components of an image to be projected are respectively combined to form a common exiting light bundle with an identical light exit angle. Thus, each holographic-optical element will emit, in the direction of the viewer, a single light bundle containing the complete chromatic information of the respective image portion. Accordingly, each holographic-optical element generates one directional light bundle. The holographic-optical elements used in the inventive projection screen are transparent, and the light incident on the holographic-optical elements will undergo merely a small diffraction. Thus, also extraneous light is approximately not diffracted. Further, the contrast and the luminosity of the projection screen of the invention are superior to those in conventional projection screens. Therefore, the projection screen is also suited for use in large-surface image projection at daylight.

The projection screen, when viewed from the intended direction, will effect a perception of color images comprising a combination of the different color contents. When viewed from a different direction, however, the projection screen is clear and transparent. The projection screen is transparent also from the rear side. The projection screen can comprise e.g. the window pane of a room. With the projectors arranged inside the room and directed to the window pane, the projected image is visible from outside. Nonetheless, daylight is allowed to enter the room from outside, and persons within the room may look outside through the window without seeing the image.

Preferably, the light exit angles of holographic-optical elements spaced in the vertical direction differ from each other in a manner causing the light exit bundles to intersect each other in a viewing plane. Further, the holographic-optical elements are preferably configured to the effect that the exiting light bundles are widened only horizontally. Due to this horizontal widening, light of the exit bundles will enter the eye of the viewer also from holographic-optical elements arranged in the side region of the projection screen. Since the exiting light bundles are not widened in the vertical direction, losses of light intensity are avoided.

Preferably, two types of holographic-optical elements are used for the projection screen. The first type comprises a single diffraction grating and one or a plurality of lenses. For causing the diffraction grating to emit a common light bundle in the direction of the viewer, the rear side of the holographic-optical element is irradiated on by light bundles separated according to chromatic components. Thus, projected onto the holographic-optical element are a light bundle comprising the red chromatic components, a light bundle comprising the green chromatic components and a light bundle comprising the blue chromatic components. The angles between the light bundles are selected in such a manner that the light bundles, after undergoing their specific diffraction according to the chromatic components by use of the diffraction grating, will coincide to form a common exiting light bundle.

In the second type of holographic-optical elements, only a common light bundle, containing all of the chromatic components of the image to be projected, is projected onto the rear side of the holographic-optical element. The common light bundle thus includes all light bundles of the individual chromatic components. The holographic-optical element comprises an individual grating for each chromatic component, and again one or a plurality of lenses. The diffraction gratings are suitably adjusted to each other to the effect that the individual chromatic components of the incident light bundle will not be separated from each other but will be issued in the direction of the viewer as a common exiting light bundle with an identical light exit angle.

Further, the two above types of holographic-optical elements can be combined and correspondingly modified in that the fundamental colors magenta, cyan and yellow are used instead of the fundamental colors red, green and blue.

In the projection system according to the invention, use is made of a projection screen comprising the first type of holographic-optical elements. Further, the projection system comprises a projector for generating the individual light bundles of the chromatic components. Since the rear side of the holographic-optical elements of the first type is illuminated by light bundles separated according to chromatic components, the projector comprises one projection device for each light bundle to be generated. According to the invention, the distance of the projection devices is adjusted in such a manner to the color-specific diffraction angles of the diffraction grating included in each holographic-optical element that each holographic-optical element combines the light bundles of the chromatic components into a common exiting light bundle with an identical light exit angle. In this projection system, the projector to be used can be a RGB projector generating a red, a green and a blue chromatic component of the image to be projected. The projection system is adapted to generate images with high luminance and high contrast because the complete light projected by the projector onto the rear side of the projection screen is diffracted in the direction of the viewer.

In a further projection system according to the invention, use is made of a projection screen comprising holographic-optical element of the second type. The projector of this projection system includes only one projection device. The projection device is arranged to project a common light bundle, comprising the individual light bundles per chromatic component, onto the rear side of the projection screen. Each holographic-optical element comprises a respective diffraction grating for each light bundle of a chromatic component. The diffraction gratings are adjusted to each other to cause each holographic-optical element to emit a common light bundle in the direction of the viewer. Since, in this projection system, there is provided for each light bundle a separate grating in each holographic-optical element, the luminance in this projection system is lower than in the projection system described above. Still, the projection system can be utilized for large-surface image projection under daylight conditions. A particular advantage of this projection system resides in that the system allows the use of a conventional projector emitting white light.

In the two above projection systems, the projector is normally arranged not centrally relative to the projection screen but at a displacement in the vertical direction. The resultant distortion of the image projected onto the projection screen can be eliminated by arranging rectification lenses in the path of rays of the projection device or the plurality of projection devices. Further, the projector can have assigned thereto an electronic rectification device by which the image to be projected is suitably distorted to generate an undistorted image on the projection screen.

The invention will be explained in greater detail hereunder by describing preferred embodiments thereof with reference to the attached drawings.

Figure 2:
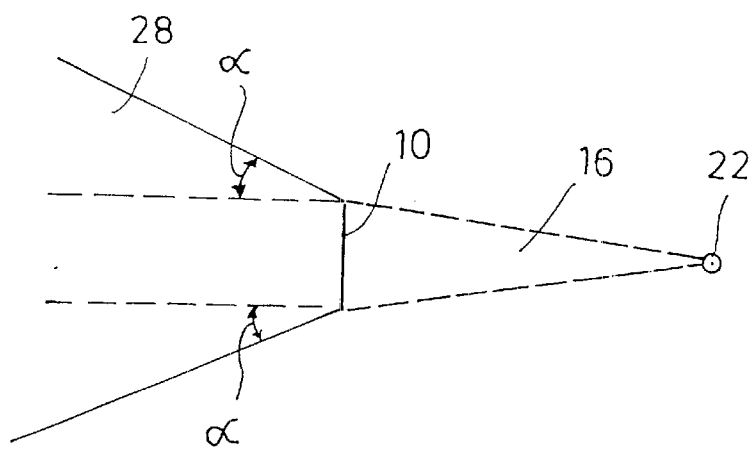

FIG. 1 is a schematic side view of a holographic-optical element of the first type and a corresponding projector, FIG. 2 is a schematic plan view of the holographic-optical element illustrated in FIG. 1, FIG. 3 is a schematic side view of a projection system comprising holographic-optical elements of the first type, FIG. 4 shows a part of a schematic front view of a projection screen, FIG. 5 is a schematic side view of an individual holographic-optical element, FIG. 6 is a schematic plan view of the holographic-optical element illustrated in FIG. 5;

FIG. 7 is a diagrammatic sketch illustrating the production of a holographic-optical element, FIG. 8 is a schematic side view of a holographic-optical element of the second type and a corresponding projector, FIG. 9 is a schematic front view of an embodiment of a holographic-optical element of the second type; and FIG. 10 is a schematic side view of a further embodiment of the projection system.

FIGS. 1–3 illustrate a projection system using the first type of holographic-optical elements 10. Three light bundles 16,18,20 are projected by a projector 14 onto a rear side of the holographic-optical element 10, i.e. onto the side facing away from a viewer 12. For generating the light bundles 16,18,20 for respective different chromatic components of an image to be projected, the projector 14 comprises three projection devices 22,24,26. Projector 14 is a conventional RGB projector, using the projection device 22 for generating a light bundle 16 for the blue chromatic components of the image, the projection device 24 for generating a light bundle 18 for the green chromatic components of the image, and the projection device 26 for generating a light bundle 20 for the red chromatic components of the image.

Illustrated in FIG. 1 are the portions of the three light bundles 16,18,20 incident on the rear side of an individual holographic-optical element 10. By means of these three light bundles 16,18,20, the complete chromatic information of an image area represented by the holographic-optical element 10 is projected onto the holographic-optical element 10.

The three light bundles 16,18,20 are differently diffracted by the holographic-optical element 10 to the effect that a light exit angle β for each light bundles 16,18, 20 is identical. Thus, the holographic-optical element 10 generates a common exiting light bundle 28 which is oriented in the direction of the viewer 12. Of decisive importance for the combining of the three light bundles 16,18,20 into one common light bundle 28 are the design of a diffraction grating provided on the holographic-optical element 10, and the angles of incidence of the individual light bundles 16,18,20. The angles of incidence of light bundles 16,18,20 can be set by changing the distances of the projection devices 22,24,26.

The holographic-optical element 10 is configured to prevent a widening of the light bundles 16,18,20 in the vertical direction (FIG. 1). In the horizontal direction, the light bundles 16,18,20 are widened by an angle α (FIG. 2). This aspect will be discussed in greater detail with reference to FIGS. 5 and 6.

In FIG. 3, there is shown a projection screen 30 of a projection system using the holographic-optical elements 10 described in connection with FIGS. 1 and 2. Each holographic-optical element 10 is provided for representation of a different image portion of the image to be projected, so that the projected image is dissected by a screen, with each screen dot being imaged by a different holographic-optical element 10. On the projection screen, there is thus presented an enlargement of the to-be-projected image which is composed of the individual holographic-optical elements 10 (FIG. 4).

In the partial view of projection screen 30, two holographic-optical elements 10a, 10b are specifically represented for exemplification. For reasons of clarification, the view shows only the green light bundles 18a, 18b which are projected by projection device 24 onto the rear sides of the holographic-optical elements 10a, 10b. By the holographic-optical elements 10a, 10b, the light bundles generated by the projection devices 22, 24 are combined, as described in connection with FIG. 1, with the green light bundles 18a, 18b to form common exiting light bundles 28a, 28b. The holographic-optical elements 10a, 10b are arranged at a vertical distance to each other and are designed to provide that the exiting light bundles 28a, 28b have a different light exit angle β and β', respectively. The light exit angle β' of the holographic-optical element 10b which relative to the viewer 12 is arranged farther up in projection screen 30 is smaller than the angle β of holographic-optical element 10a arranged at a lower position. The holographic-optical element 10b is suitably configured to have the exiting light bundle 28b intersect the exiting light bundle 28a in a common viewing plane 32. The other holographic-optical elements 10 of projection screen 30 are likewise configured to create a respective light exit angle β of such an amount that all of the exiting light bundles 28 of the holographic-optical elements will intersect each other in the viewing plane. The higher a holographic-optical element 10 is arranged in projection screen 30 relative to the viewer 12, the smaller the angle β will be. Accordingly, the amount of angle β is increased if a holographic-optical element 10 is arranged at a lower position than the viewer 12. The light exit angles β of holographic-optical elements arranged in a horizontal line are equal to each other.

Since the projector 14 is arranged in the vertical direction at a lower position than projection screen 30, the image formed on projection screen 30 is distorted. To rectify the image shift lenses are provided in the optical paths of projector 14. By way of alternative, a rectified representation of the image on projection screen 30 can be obtained by an electronic rectification device for computerized rectification of the image to be projected.

The holographic-optical elements 10 comprise a film plane 34 (FIGS. 5 and 6) having the diffraction grating arranged therein for refracting the light bundles 16,18,20 of the different chromatic components to different extents. On the rear side of the film plane 34, a plurality of cylinder lenses 36 are provided, arranged in parallel to each other in a plane so that a screen cylinder lens 38 is formed. The distance between adjacent cylinder lenses 36 is small when compared to the distance between the viewer 12 and the projection screen 30. Preferably, the cylinder lenses 36 have a diameter of about 1 mm and are arranged to have adjacent cylinder lenses 36 contact each other. The screen cylinder lens 38 has the effect that the light bundles 16,18,20 incident on the holographic-optical element 10 are monochromatically widened only horizontally (FIG. 2). The cross section of the cylinder lenses is preferably circular; however, the cylinder lenses can also have an elliptic or a differently curved shape. The image to be projected is formed by the cylinder lenses 36 in the focal lines. Since the cylinder lenses 36 preferably have a diameter of about 1 mm, the viewer 12 will not be able to discern the mutually parallel focal lines separately from each other so that a coherent image is generated. The individual holographic-optical elements 10 have a size of e.g. 20×30 mm.

Holographic-optical elements 10 arranged at vertical distances to each other have to comprise a different diffraction grating because the exiting light bundle must exit in different light exit angles β from the holographic-optical elements 10 (FIG. 3). For generating the diffraction grating, the film 34 is exposed by parallel light 40 (FIG. 7) as well as by coherent parallel light 42 of identical wavelength. The light 40 is oriented vertically to film 34. The light 42 is directed to film 34 under an angle γ. The angle y corresponds e.g. to the angle between the green light bundle 18 and the rear side of the holographic-optical element 10 (FIG. 1). Thus, the vertical position of the holographic-optical element 10 in the projection screen 30 is determined by the angle γ of the light 42 used for exposing the film 34. The higher a holographic-optical element 10 is arranged in projection screen 30, the smaller the angle γ during the exposure of film 34 has to be.

The transmission of the light 40 and the light 42, which are identical in wave-length, generates an interference pattern on film 34. By the development of film 34, a diffraction grating corresponding to the interference pattern is generated. After development of the film, the screen cylinder lens 38 is laid onto the rear side of the film, and the position of film 34 relative to screen cylinder lens 38 will be fixed e.g. between glass or plastic plates.

FIGS. 8 and 9 illustrate a further projection system wherein the second type of the holographic-optical elements is used. In this case, using a projector 14 comprising a projection device 50, a light bundle 52 is projected onto the rear side of a holographic-optical element 54. Since the projection device 50 emits white light onto the image to be projected, the light bundle 52 includes a combination of the light bundles for the red, the green and the blue chromatic components of the projected image which in FIG. 1 are represented by dotted, continuous or interrupted lines. The holographic-optical element 54 is a of such a configuration that, instead of splitting the light bundle 52 into the individual color-specific light bundles, it will emit—in a manner corresponding to the holographic-optical element 10—a common light bundle 56 with the same light exit angle β in the direction of the viewer.

For this purpose, the holographic-optical element 54 comprises three different diffraction gratings 58,60,62 (FIG. 9), wherein, e.g. the diffraction grating 58 is to diffract the red chromatic component, the diffraction grating 60 is to diffract the green chromatic component and the diffraction grating 62 is to diffract the blue chromatic component of light bundle 52. Instead of arranging three diffraction gratings 58,60,62 next to each other, it is also possible to expose three films independently from each other and to arrange the diffraction gratings above each other. The diffraction gratings are generated corresponding to the production method described with reference to FIG. 7, wherein, for generating diffraction gratings 58,60,62 next to each other, a mask is placed on the film 34 and, for generating the first diffraction grating 58, the film is exposed by light under a corresponding angle of incidence γ. Subsequently, the mask is shifted, and, for generating the diffraction grating 60, the film 34 is exposed by light under a suitably changed angle of incidence γ. For generating the third diffraction grating 62, the mask is shifted again and the film 34 is exposed by light under a third angle of incidence γ. The generation of diffraction gratings with different light exit angles β is performed corresponding to the process described with reference to FIG. 7, i.e. by changing the angle γ. In this case, the light 40 and the light 42 for generating the interference pattern have the same wavelength.

Otherwise, the projection system described with reference to FIGS. 8 and 9 corresponds to the projection system illustrated in FIGS. 1–4. The light bundles are widened in the horizontal direction again by the angle α (FIG. 2), and the projection screen 30 again comprises holographic-optical elements 54 arranged next to each other. Also the holographic-optical elements 54 comprises a screen cylinder lens 38 and one or a plurality of exposed films which have been exposed in the same manner as described above.

In a further embodiment of a projection system, the projector 14 (FIG. 10) is arranged, relative to projection screen 30, on the side of the viewer 12. A mirror 66 is provided behind projection screen 30. Mirror 66 is provided to reflect the light bundles 16,18,20 generated by projection devices 22,24,26 onto the rear side of projection screen 30. Thus, also this projector 14 is designed for back-projection. As an alternative to the three projection devices 22,24,26, it is also possible to provide-the individual projection device 50 (FIG. 8) and thus, in projection screen 30, the second type of the holographic-optical elements 54.

What is claimed is:

1. A projection screen, particularly for large-surface image projection, for representing images by back-projection, comprising a plurality of holographic-optical elements arranged in an imaging plane and respectively adapted for imaging thereon partial regions of an image to be projected, said elements being configured to have the optical properties of a diffraction grating and at least one lens, wherein each holographic-optical element is arranged to combine light bundles of different chromatic components of the to-be-projected partial region which are incident under different light entry angles, into a common exiting light bundle having a uniform light exit angle, characterized in that the holographic-optical elements respectively comprise only one diffraction grating, and that the diffraction grating is arranged to diffract the light bundles of the individual chromatic components under different diffraction angles, and each holographic-optical element comprises a screen cylinder lens including a plurality of cylinder lenses.

2. The projection screen according to claim 1, characterized in that the distance between the viewing plane and the screen cylinder lens is large as compared to the distance between adjacent cylinder lenses.

3. The projection screen according to claim 1, characterized in that the cylinder lenses are arranged in one plane.

4. The projection screen according to claim 1, characterized in that the light exit angles of the holographic-optical elements spaced in vertical direction are different in such a manner that the exiting light bundles will intersect each other in a viewing plane.

5. The projection screen according to claim 1, characterized in that the holographic-optical elements widen the exiting light bundles only horizontally.

6. A projection system comprising a projection screen according to claim 1 and a projector, wherein the projector, for generating the individual light bundles of the chromatic components, comprises respectively one projection device, and the distance of the projection devices is adjusted in such a manner to the chromatic-component-specific diffraction angles that each holographic-optical element combines the light bundles of the chromatic components into one exiting light bundle with an identical light exit angle.

7. A projection screen, particularly for large-surface image projection, for representing images by back-projection, comprising a plurality of holographic-optical elements arranged in an imaging plane and respectively adapted for imaging thereon partial regions of an image to be projected, said elements being configured to have the optical properties of a plurality of diffraction gratings and at least one lens, wherein each holographic-optical element is arranged to combine a common light bundle of all of the chromatic components of the to-be-projected partial region which are incident under the same light entry angle, into a common exiting light bundle having a uniform light exit angle, characterized in that each holographic-optical element comprises a screen cylinder lens including a plurality of cylinder lenses.

8. The projection screen according to claim 7, characterized in that the holographic-optical elements comprise respectively one component.

9. The projection screen according to claim 7, characterized in that the holographic-optical element comprises three different diffraction gratings arranged either next to each other or above each other.

10. A projection system comprising a projection screen according to claim 7 and a projector, wherein the projector comprises only one projection device, and the holographic-optical elements comprise a respective diffraction grating for the components into one exiting light bundle with an identical light exit angle.

11. The projection system according to claim 10, characterized in that the projector is arranged on the viewer side of the projection screen and that a mirror is provided on the rear side of the projection screen.

* * * * *